No. 750,714. PATENTED JAN. 26, 1904.
S. P. SHRIBER.
FUR BEATER.
APPLICATION FILED JUNE 23, 1903.
NO MODEL.
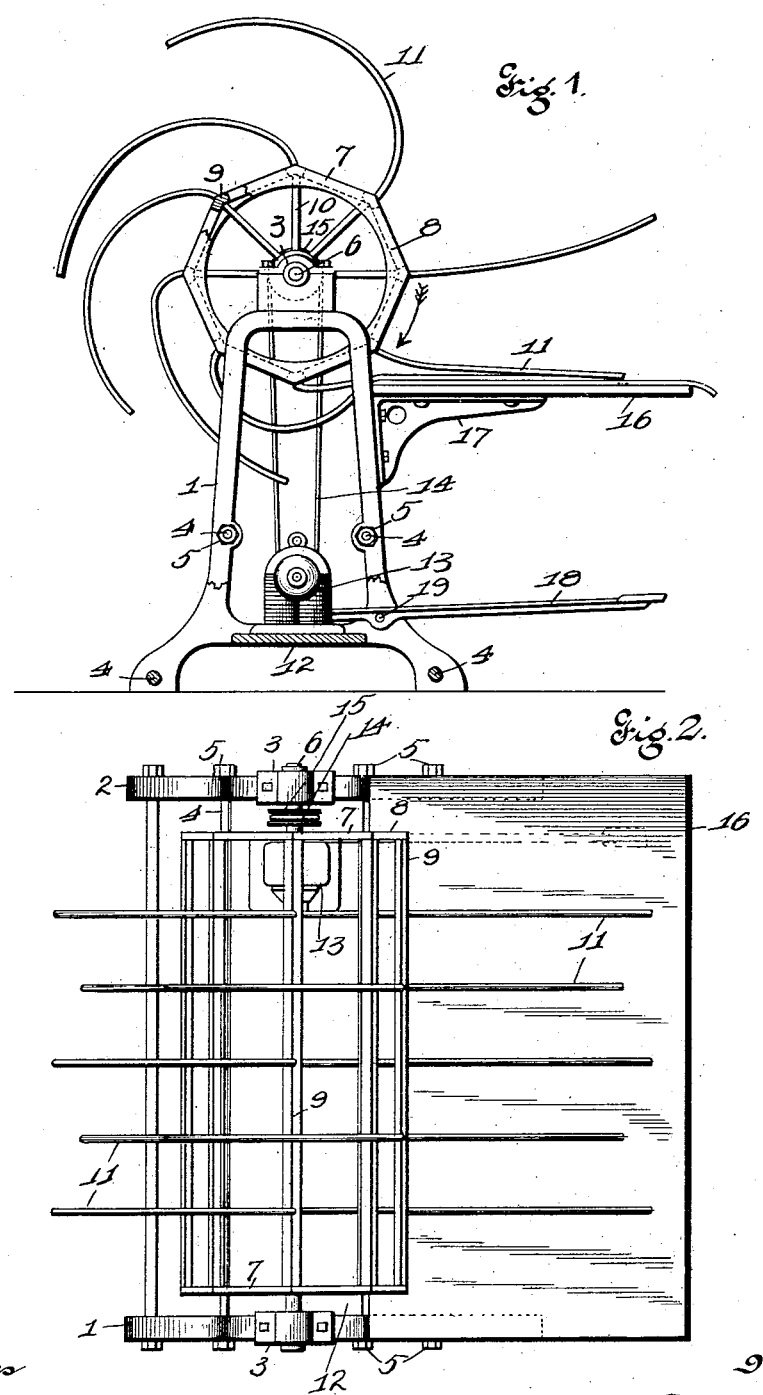

No. 750,714.

Patented January 26, 1904.

UNITED STATES PATENT OFFICE.

SAMUEL P. SHRIBER, OF ST. LOUIS, MISSOURI.

FUR-BEATER.

SPECIFICATION forming part of Letters Patent No. 750,714, dated January 26, 1904.

Application filed June 23, 1903. Serial No. 162,737. (No model.)

*To all whom it may concern:*

Be it known that I, SAMUEL P. SHRIBER, a citizen of the United States, residing at St. Louis, State of Missouri, have invented certain new and useful Improvements in Fur-Beaters, of which the following is a specification containing a full, clear, and exact description, reference being had to the accompanying drawings, forming a part hereof.

My invention relates to fur-beaters; and it consists in the novel construction hereinafter described and claimed.

The object of my invention is to provide an improved fur-beater which shall be more efficient in operation than machines heretofore constructed and at the same time possess simplicity and durability of construction.

In the drawings, Figure 1 is a sectional side elevation of a fur-beater embodying my invention. Fig. 2 is a plan view of the same.

1 and 2 indicate a pair of opposite vertical frames provided with supporting-legs at their lower ends and each at its upper end with a journal-box 3. The lower and medial portions of said frames are connected and spaced apart by means of horizontal bars or bolts 4, having nuts 5 upon their outer ends, and the upper ends of said vertical frames are connected by a horizontal shaft 6, which is mounted in said journal-boxes 3. Fixed upon said horizontal shaft within the space between the upper ends of said vertical frames is a cage 7 of preferably octagonal form, as shown. This cage is composed of a pair of octagonal ends 8, horizontal bars 9, connecting said octagonal ends, and radial arms 10, connecting said parts to said shaft.

A series of "whips" 11, preferably composed of leather straps, have their inner ends secured in any common manner to the horizontal bars 9. Said whips may of course be of any other suitable material, such as rope or cords, and there should be quite a number upon each horizontal bar. In any event the number of whips should be ample, but may be readily determined by the judgment of the manufacturer.

12 indicates a horizontal platform extending from one vertical frame to another, near the bottom thereof. Upon this platform is mounted a suitable motor 13, which is preferably of the electric form, and a belt 14 extends from said motor to a pulley 15, mounted on the shaft 6, for the purpose of rotating said cage and the whips carried thereby.

16 indicates a work-table supported upon brackets 17, projecting laterally from the front edge of the vertical frames 1 and 2, so that the top of said work-table is supported about in the plane of the bottom of the said cage.

18 indicates a foot-lever pivoted at 19 to the vertical frame 2 and extending inwardly to a point adjacent the motor 13, and the inner end of said foot-lever is provided with any common means for controlling or regulating the speed of said motor. Said foot-lever must of course be sufficiently long to reach outwardly to a point approximating the vertical plane in which the outer edge of the work-table is located, so that the operator standing or sitting at that point may conveniently reach said foot-lever.

The operation is as follows: The fur to be beaten is placed upon the work-table 16, and then the motor 13 is started, and the operator controls the speed thereof by means of the foot-lever 18. The motor should rotate the cage and its whips 11 in the direction indicated by the arrow in Fig. 1 at considerable speed, and this will cause said whips to be brought into violent contact with the fur placed upon the table, and the said fur will thereby be very rapidly cleaned.

What I claim is—

The improved fur-beater, comprising two vertical frames having journal-boxes at their upper ends, a horizontal shaft mounted in said journal-boxes, a whip-cage mounted upon said shaft between the upper ends of said vertical frames, a horizontal platform beneath said cage, a motor mounted on said platform, a belt connecting said motor to said cage for rotating the latter, a work-table projecting laterally from said vertical frames at a point below the plane of said journal-boxes, and a foot-lever pivotally connected to one of said frames and extending beneath said work-table for the purpose of controlling said motor, substantially as described.

In testimony whereof I have signed my name to this specification in presence of two subscribing witnesses.

SAMUEL P. SHRIBER.

Witnesses:
ALFRED A. EICKS,
JOHN C. HIGDON.